United States Patent
Ball (10) Patent No.: US 11,997,014 B2
(45) Date of Patent: May 28, 2024

(54) AUTOMATIC POLICY CONFIGURATION FOR PACKET FLOWS

(71) Applicant: Juniper Networks, Inc., Sunnyvale, CA (US)

(72) Inventor: Darrell Ball, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 77 days.

(21) Appl. No.: 17/450,147

(22) Filed: Oct. 6, 2021

(65) Prior Publication Data

US 2023/0146525 A1    May 11, 2023

(51) Int. Cl.
*H04L 45/00* (2022.01)
*H04L 45/745* (2022.01)

(52) U.S. Cl.
CPC ............ *H04L 45/745* (2013.01); *H04L 45/38* (2013.01)

(58) Field of Classification Search
None
See application file for complete search history.

(56) References Cited

U.S. PATENT DOCUMENTS

| | | | |
|---|---|---|---|
| 11,700,190 B2* | 7/2023 | Yadav .................... | G06F 16/122 718/1 |
| 2015/0009831 A1* | 1/2015 | Graf ..................... | H04L 12/6418 370/236 |
| 2015/0124828 A1* | 5/2015 | CJ ........................ | H04L 12/4633 370/392 |
| 2016/0006654 A1 | 1/2016 | Fernando et al. | |
| 2017/0093891 A1* | 3/2017 | Mitchell ................. | H04L 69/22 |

FOREIGN PATENT DOCUMENTS

| | | | | |
|---|---|---|---|---|
| EP | 3617879 A1 | 3/2020 | | |
| JP | 4213517 B2 * | 1/2009 | ......... | H04L 67/1002 |
| WO | 2013184846 A1 | 12/2013 | | |

OTHER PUBLICATIONS

Extended Search Report from counterpart European Application No. 22200102.6 dated Jan. 18, 2023, 8 pp.
Response to Extended Search Report dated Jan. 18, 2023, from counterpart European Application No. 22200102.6 filed Oct. 11, 2023, 40 pp.
Communication pursuant to Article 94(3) EPC from counterpart European Application No. 22200102.6 dated Feb. 1, 2024, 6 pp.

* cited by examiner

*Primary Examiner* — Gerald A Smarth
(74) *Attorney, Agent, or Firm* — Shumaker & Sieffert, P.A.

(57) ABSTRACT

Techniques are disclosed for providing automatic policy configuration for packet flows. For example, a computing device comprises a virtual node and one or more virtual execution elements coupled to the virtual node. The computing device may also comprise one or more processors configured to: receive a packet originating from an application workload hosted on the one or more virtual execution elements and destined for a remote destination device; determine the packet is part of a new packet flow; in response, configure, by a kernel of the computing device and without sending the packet to a user space of the computing device, a policy for a forward packet flow for the new packet flow; configure, by the kernel, a policy for a reverse packet flow associated with the forward packet flow; and send the packet toward the remote destination device in accordance with the policy for the forward packet flow.

20 Claims, 4 Drawing Sheets

AUTOMATIC POLICY CONFIGURATION FOR PACKET FLOWS

TECHNICAL FIELD

This disclosure generally relates to computer networks.

BACKGROUND

A computer network is a collection of interconnected computing devices that can exchange data and share resources. In a packet-based network, such as the Internet, the computing devices communicate data by dividing the data into variable-length blocks called packets, which are individually routed across the network from a source device to a destination device. The destination device extracts the data from the packets and assembles the data into its original form.

Certain computing devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Computing devices may be configured to process packet flows. The term "packet flow," "traffic flow," or simply "flow" refers to a set of packets originating from a particular source device or endpoint and sent to a particular destination device or endpoint. A single flow of packets may be identified by information in the packet, e.g., 5-tuple: <source address, destination address, source port, destination port, protocol> and a zone. This information generally identifies a packet flow to which a received packet corresponds and to identify an associated policy for the packet flow ("policy flow") for forwarding the packet.

SUMMARY

In general, the disclosure describes techniques for providing automatic policy configuration for packet flows. For example, a computing device may automatically configure policy flows with a kernel of the computing device without sending packets to the user space of the computing device. The computing device may, in some examples, host an application workload that originates packets to be forwarded to a remote destination device. When a virtual node running in the kernel of the computing device receives a packet from the application workload, the virtual node examines information of the packet (e.g., 5-tuple and zone) to determine whether the packet matches an existing packet flow. If the packet does not belong to an existing packet flow and the packet originated from a locally hosted application workload, the computing device may configure, with the kernel of the computing device, a policy for a forward packet flow and a policy for a reverse packet flow (e.g., packet flow in the reverse direction of the forward packet flow) without sending the packet to the user space. For example, the computing device may configure a flow action of the policy for the forward packet flow to forward packets originating from the application workload and destined to a remote destination device. The kernel may also perform a lookup of the forwarding information with an L3 address (e.g., destination IP address) of the packet to determine the next hop and configures the next hop for the forward packet flow as an entry within the flow information.

The kernel of the virtual router may also configure a policy for the reverse packet flow while handling the packet flowing in the forward direction. The kernel of the computing device may map an identifier of a virtual network of the application workload (e.g., virtual network identifier (VNI) such as VXLAN tag or MPLS label) to a zone associated with the application workload, and configure the virtual node to determine the zone from the VNI or MPLS label included in a packet received in the reverse direction (e.g., packet originating from remote destination device and destined to the application workload). In this way, the virtual node perform a lookup of the flow information using the zone determined from the VNI or MPLS label included in a packet received in the reverse direction to determine the policy for the reverse packet flow. The kernel of the computing device may also configure a next hop for the reverse packet flow to the virtual execution element hosting the application workload.

The techniques described in this disclosure may provide one or more technical advantages that realizes at least one practical application. For example, by using a kernel of the computing device to configure policies for packet flows without sending the packet to the user space of the computing device, the computing device reduces the number of packets sent to the user space. This results in reducing the amount of processing resources of the computing device necessary to configure and apply policies for packet flows, and may also increase the speed at which the computing device processes packets. This may also reduce instances of a denial-of-service that may result from sending a large number of packets to the user space. This can enable more efficient and scalable packet forwarding.

In one example, this disclosure describes a method comprising receiving, by a virtual node implemented by a computing device, a packet originating from an application workload hosted on the computing device and destined for a remote destination device; determining, by the virtual node, the packet is part of a new packet flow; in response to determining the packet is part of a new packet flow, configuring, by a kernel of the computing device and without sending the packet to a user space of the computing device, a policy for a forward packet flow for the new packet flow; configuring, with the kernel of the computing device, a policy for a reverse packet flow associated with the forward packet flow; and sending, by the computing device, the packet toward the remote destination device in accordance with the policy for the forward packet flow.

In another example, this disclosure describes a computing device comprising: a virtual node; one or more virtual execution elements coupled to the virtual node; one or more processors, wherein the one or more processors are configured to: receive a packet originating from an application workload hosted on the one or more virtual execution elements and destined for a remote destination device; determine the packet is part of a new packet flow; in response to determining the packet is part of a new packet flow, configure, by a kernel of the computing device and without sending the packet to a user space of the computing device, a policy for a forward packet flow for the new packet flow; configure, with the kernel of the computing device, a policy for a reverse packet flow associated with the forward packet flow; and send the packet toward the remote destination device in accordance with the policy for the forward packet flow.

In another example, this disclosure describes a non-transitory computer-readable medium comprising instructions that, when executed, cause one or more processors to: receive a packet originating from an application workload hosted on the one or more virtual execution elements and destined for a remote destination device; determine the packet is part of a new packet flow; in response to determining the packet is part of a new packet flow, configure, by a kernel of the computing device and without sending the packet to a user space of the computing device, a policy for a forward packet flow for the new packet flow; configure, with the kernel of the computing device, a policy for a reverse packet flow associated with the forward packet flow; and send the packet toward the remote destination device in accordance with the policy for the forward packet flow. Moreover, the techniques described in this disclosure enable the creation of new packet flows when the user space is unavailable (e.g., during upgrade) and avoids the need to drop new flow packets during the time in which the user space application is unavailable.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
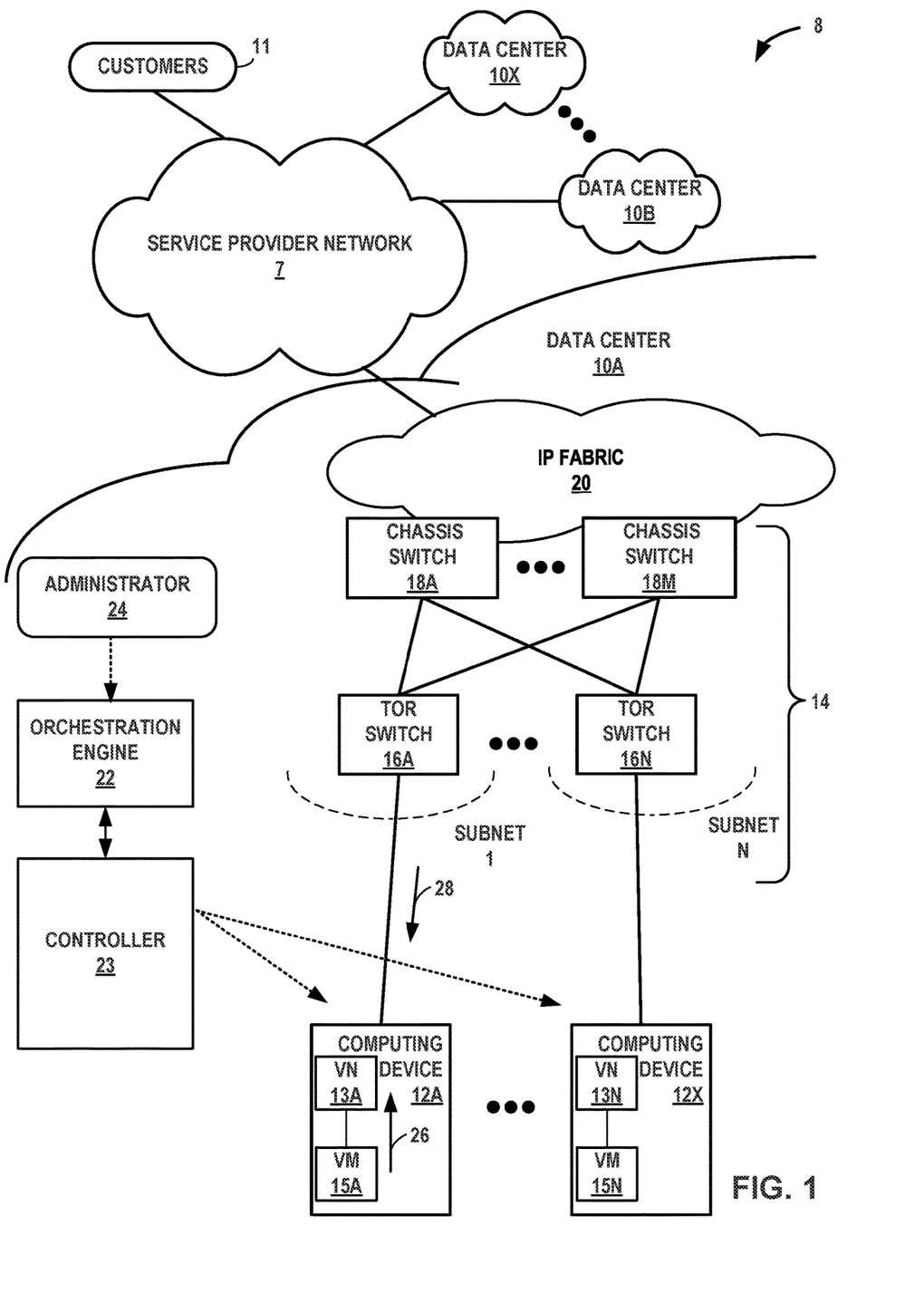
FIG. 1 is a block diagram illustrating an example network system for providing automatic policy configuration for packet flows, in accordance with techniques described in this disclosure.

FIG. 1 is a block diagram illustrating an example network system for providing automatic policy configuration for packet flows, in accordance with techniques described in this disclosure. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 10 may be individual network servers, network peers, or otherwise.

In this example, each of data centers 10 includes a set of storage systems and application servers 12A-12X (herein, "computing device 12") interconnected via high-speed switch fabric 14 provided by one or more tiers of physical network switches and routers. Computing devices 12 function as compute nodes of the data center. In some examples, the terms "compute nodes" or "computing devices" and "servers" are used interchangeably herein to refer to computing devices 12. Each of computing devices 12 may be configured with virtual execution elements by virtualizing resources of the computing device to provide an isolation among one or more processes (applications) executing on the computing device. "Hypervisor-based" or "hardware-level" or "platform" virtualization refers to the creation of virtual execution elements that each includes a guest operating system for executing one or more processes. In general, a virtual execution element provides a virtualized/guest operating system for executing applications in an isolated virtual environment. Because a virtual execution element is virtualized from physical hardware of the host computing device, executing applications are isolated from both the hardware of the host and other virtual execution elements. The term "virtual execution element" encompasses virtual machines ("VMs"), containers, and other virtualized computing resources that provide an (at least partially) independent execution environment for applications. These virtual execution elements can be tenants running virtualized application workloads, and may be referred to herein as a virtualized application workload (or just application workload). Each of the virtual network endpoints may use one or more virtual network interfaces for communicating on corresponding virtual networks. In the example of FIG. 1, computing devices 12A-12N may host virtual machines 15A-15N (collectively, "VMs 15") that provide an independent execution environment for application workloads.

Virtual networks are logical constructs implemented on top of the physical network of data center 10A. Virtual networks can be implemented using a variety of mechanisms. For example, each virtual network may be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (computing device, router, storage device, etc.) to any other physical device. The underlay network may provide uniform low-latency, non-blocking, high-bandwidth connectivity from any point in the network to any other point in the network.

Virtual networks can be connected to, and extended across physical Multi-Protocol Label Switching (MPLS) Layer 3 Virtual Private Networks (L3VPNs) and Ethernet Virtual Private Networks (EVPNs) networks using an edge device (e.g., router) of data center 10A (not shown in FIG. 1).

Virtual nodes running in the kernels or hypervisors of computing devices 12 create a virtual overlay network on top of the physical underlay network using a mesh of dynamic "tunnels" amongst themselves. These overlay tunnels can be MPLS over GRE/UDP tunnels, VXLAN tunnels, or NVGRE tunnels, for instance. The underlay physical routers and switches might not contain any per-tenant state for virtual machines or other virtual execution elements, such as any Media Access Control (MAC) addresses, IP addresses, or policies. The forwarding tables of the underlay physical routers and switches may, for example, only contain the IP prefixes or MAC addresses of the physical computing devices 12 (gateway routers or switches that connect a virtual network to a physical network are an exception and may contain tenant MAC or IP addresses).

Virtual nodes 13 of computing devices 12 often contain per-tenant state. For example, they may contain a separate forwarding table (a routing-instance) per virtual network. That forwarding table contains the IP prefixes (in the case of layer 3 overlays) or the MAC addresses (in the case of layer 2 overlays) of the virtual machines or other virtual execution elements (e.g., pods of containers). No single virtual node 13 needs to contain all IP prefixes or all MAC addresses for all virtual machines in the entire data center. A given virtual node 13 only needs to contain those routing instances that are locally present on the computing device (i.e., which have at least one virtual execution element present on the computing device 12).

Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide computing devices 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Network system 2 implements an automation platform for automating deployment, scaling, and operations of virtual execution elements across computing devices 12 to provide virtualized infrastructure for execution of application workloads and services. For example, data centers 10 may include a Software-Defined Network ("SDN") platform to control and manage network behavior. In some cases, an SDN platform includes a logically centralized, and in some cases, physically distributed SDN controller, e.g., controller 23, and a distributed forwarding plane in the form of virtual nodes, e.g., virtual nodes 13, that extend the network from physical routers and switches in the data center switch fabric into a virtual overlay network hosted in virtualized computing devices. Controller 23 facilitates operation of one or more virtual networks within each of data centers 10, such as data center 10A, in accordance with one or more examples of this disclosure. In some examples, controller 23 may operate in response to configuration input received from orchestration engine 22, which in turn operates in response to configuration input received from network administrator 24. Additional information regarding controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 22 manages application-layer functions of data center 10 such as managing compute, storage, networking, and application resources executing on computing devices 12. "Orchestration," in the context of a virtualized computing infrastructure, generally refers to provisioning, scheduling, and managing virtual execution elements and/or applications and application services executing on such virtual execution elements to the host servers available to the orchestration platform. For example, orchestration engine 22 may attach virtual machines to a tenant's virtual network and generally manage the launching, migration, and deconstruction of the VMs as needed. In other examples, container orchestration permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Orchestrator 22 and controller 23 together implement a controller for the network system 2. Orchestrator 22 and controller 23 may execute on separate computing devices or execute on the same computing device. Each of orchestrator 22 and controller 23 may be a distributed application that executes on one or more computing devices.

In some examples, controller 23 is a lower-level controller tasked with managing the network and networking services of data center 10A and, in particular, virtual services such as virtual firewalls of computing devices 12. Controller 23 utilizes a set of communication protocols to configure the network. A communication protocol may include a messaging protocol such as eXtensible Messaging and Presence Protocol (XMPP), for example. For example, controller 23 implements high-level requests from orchestration engine 22 by configuring physical switches, e.g., TOR switches 16, chassis switches 18, and switch fabric 14; physical routers; physical service nodes such as firewalls and load balancers; and virtual services such as virtual firewalls in a VM. Controller 23 maintains routing, networking, and configuration information within a state database. Controller 23 communicates a suitable subset of the routing information and configuration information from the state database to virtual network (VN) agents on each of computing devices 12A-12N. For example, controller 23 may communicate MPLS labels or virtual network identifiers such as VXLAN tags between computing devices 12 and other devices in data center 10A.

Virtual nodes 13 may be configured to process packets as packet flows. The term "packet flow," traffic flow," or simply "flow" refers to a set of packets originating from a particular source device or endpoint and sent to a particular destination device or endpoint. A single flow of packets may be identified by information in the packet, e.g., 5-tuple: <source address, destination address, source port, destination port, protocol> and a zone. This information generally identifies a packet flow to which a received packet corresponds and to identify an associated policy for the packet flow ("policy flow") for forwarding the packet.

Typically, a computing device reactively creates a policy for packet flows. For example, when a virtual node running in a kernel of the computing device receives a packet, the virtual router examines the information in the packet (e.g., 5-tuple and zone) to determine whether the packet matches an existing packet flow in its flow information (e.g., flow table) and, if the packet does not belong to an existing packet flow, sends the packet to a user space of the computing device to configure a policy for the new packet flow. For instance, the user space of the computing device performs a lookup of a policies database in the user space to determine how to configure the policy for the packet flow and to install flow information for the new packet flow. In some examples, the user space may further send the packet to Netfilter provided by a Linux kernel to determine a reverse packet flow for the packet such that the user space of the computing device may configure the reverse packet flow. Although reactively creating policy flows may limit unnecessary policy flows from being programmed for all packet flows (e.g., for all combinations of the 5-tuple and zone), reactively creating policy flows may consume a lot of processing resources due to a large number of packets being sent to the user space (and Netfilter) and may further result in denial-of-service (DOS).

In accordance with the techniques described in this disclosure, a virtual router implemented by a computing device may provide automatic policy configuration for packet flows using, e.g., a kernel of the computing device and without sending packets to the user space, in accordance with techniques described in this disclosure. For example, computing device 12A may host VM 15A that provides an execution environment for an application workload. The application workload may originate a packet, e.g., packet 26, to be sent to a remote destination device, e.g., customers 11 or a remote computing device hosted in one of data centers 10B-10X, via service provider network 7. Virtual node 13A running in a kernel of computing device 12A may receive packet 26 from the application workload and examine the information in packet 26 (e.g., 5-tuple and zone) to identify whether packet 26 belongs to an existing packet flow. For example, a virtual node 13A may perform a lookup of flow information (e.g., from a flow table) to determine whether keying information within packet 26 matches an entry within the flow information. If the keying information within packet 26 does not match an entry within the flow information (and thus does not belong to an existing packet flow), computing device 12A may, instead of sending packet 26 to a user space of the computing device, configure, via the kernel of computing device 12A, a policy for the forward packet flow. Computing device 12A may determine not to send packet 26 to the user space because packet 26 is originated from an application workload that is locally hosted by computing device 12A and is therefore a trusted source. For example, computing device 12A may determine that the source address and/or source port of packet 26 identifies a network address (e.g., IP address) and/or port of VM 15A.

The kernel of computing device 12A may configure a flow action of the policy for the forward packet flow to forward packets originating from the application workload. The kernel may also perform a lookup of the forwarding information with an L3 address (e.g., destination IP address) of packet 26, e.g., either with an exact match or a longest prefix match (LPM), to determine the next hop and configures the next hop for the forward packet flow as an entry within the flow information.

In some examples in which the policy for the forward packet flow includes a source network address translation (NAT) to translate private address to a public address of a packet originating from the application workload (e.g., VM 15A), the kernel of computing device 12A may use the same IP address and/or port mapping as the next hop for the forward packet flow because the uniqueness of the zone portion of the flow key can be exploited to determine where (e.g., which application workload interface) to send packets of a reverse packet flow. In some examples, the kernel of computing device 12A may configure other policies.

The kernel of virtual router 13A may also configure a policy for the reverse packet flow while handling packet 26 flowing in the forward direction. The forward and reverse packet flows are related to one another in that the source address and source port of the forward packet flow is the same as the destination address and destination port of the reverse packet flow, and the destination address and destination port of the forward packet flow is the same as the source address and source port of the reverse packet flow.

As described above, virtual node 13A may forward packet 26 to a remote destination device using VXLAN tunnels or MPLS over GRE/UDP tunnels. In some examples in which virtual node 13A forwards packet 26 using a VXLAN tunnel, an ingress interface of virtual node 13A may encapsulate packet 26 with a virtual network identifier (VNI) such as a VXLAN tag that identifies the virtual network of the application workload. In some examples in which virtual node 13A forwards packet 26 using an MPLS over GRE/UDP tunnel, an ingress interface of virtual node 13A may encapsulate packet 26 with an MPLS label that identifies the virtual network of the application workload.

Because virtual node 13A may map the VNI or MPLS label with the application workload, the kernel of computing device 12A may further map the VNI or MPLS label to a zone associated with a virtual interface to the virtual network to reach the application workload, and configure virtual node 13A to perform a lookup of the flow information using the zone determined from the VNI or MPLS label included in a packet received in the reverse direction (e.g., packet originating from customers 11 or a remote server hosted in one of data centers 10B-10X and destined for the application workload that is locally hosted by server 12A). The kernel of computing device 12A may also configure a next hop for the reverse packet flow to VM 15A hosting the application workload based on the information in packet 26, such as the source address and source port.

When virtual node 13A receives a packet in the reverse direction, e.g., packet 28, virtual router 13A examines the information in packet 28 (e.g., 5-tuple and zone) to identify whether packet 28 belongs to an existing packet flow. Virtual node 13A determines the zone from the VNI or MPLS label included in packet 28 and using the zone and other information in packet 28 as keying information, performs a lookup of the flow information to determine the policy for the reverse packet flow. Virtual node 13A then forwards packet 28 to VM 15A in accordance with the policy for the reverse packet flow.

Figure 2:
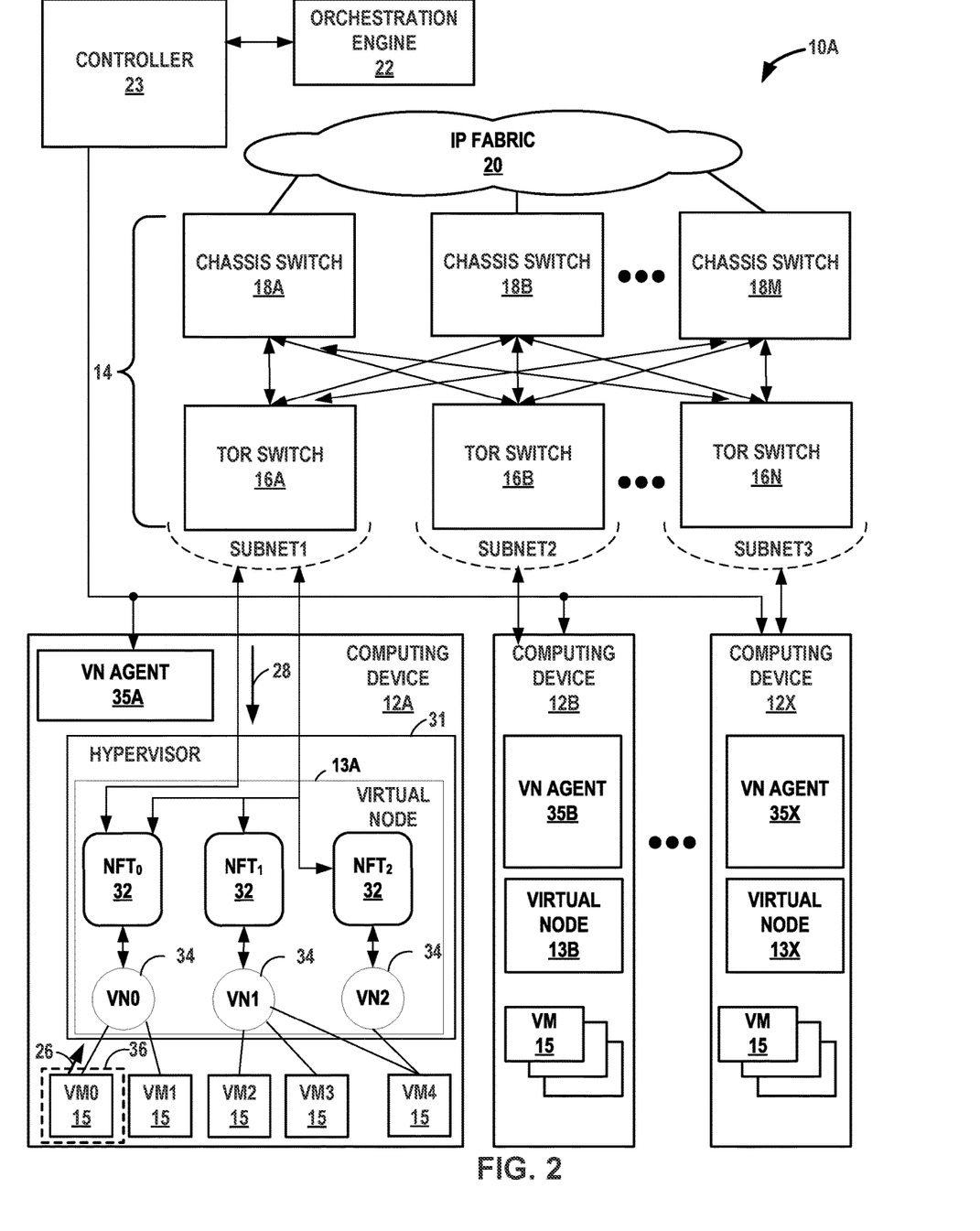
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, virtual nodes 13A-13X (collectively, "virtual nodes 13") dynamically create and manage one or more virtual networks 34 usable for communication between application instances. In one example, virtual nodes 13 execute the virtual network as an overlay network, which provides the capability to decouple an application's virtual address from a physical address (e.g., IP address) of the one of computing devices 12A-12X (collectively, "computing devices 12") on which the application is executing. Each virtual network may use its own addressing and security scheme and may be viewed as orthogonal from the physical network and its addressing scheme. Various techniques may be used to transport packets within and across virtual networks 34 over the physical network.

Each virtual node 13 may execute within a hypervisor, a host operating system or other component of each of computing devices 12. Each of computing devices 12 may represent an x86 or other general-purpose or special-purpose server capable of executing virtual machines 15. In the example of FIG. 2, virtual node 13A executes within hypervisor 31, also often referred to as a virtual machine manager (VMM), which provides a virtualization platform that allows multiple operating systems to concurrently run on one of computing devices 12. In the example of FIG. 2, virtual node 13A manages virtual networks 34 (e.g., VN0-VN2), each of which provides a network environment for execution of one or more virtual machines (VMs) 15 on top of the virtualization platform provided by hypervisor 31. Each VM 15 is associated with one of the virtual networks VN0-VN2 and may represent tenant VMs running customer applications such as Web servers, database servers, enterprise applications, or hosting virtualized services used to create service chains. In some cases, any one or more of computing devices 12 or another computing device may host customer applications directly, i.e., not as virtual machines. In some cases, some of VMs 15 may represent containers, another form of virtualized execution environment. That is, both virtual machines and container are examples of virtualized execution environments for executing application workloads.

In general, each VM 15 may be any type of software application and may be assigned a virtual address for use within a corresponding virtual network 34, where each of the virtual networks may be a different virtual subnet provided by virtual node 13A. A VM 15 may be assigned its own virtual layer three (L3) IP address, for example, for sending and receiving communications but may be unaware of an IP address of the physical computing device 12A on which the virtual machine is executing. In this way, a "virtual address" is an address for an application that differs from the logical address for the underlying, physical computer system, e.g., computing device 12A in the example of FIG. 1 or 2.

In one implementation, each of computing devices 12 includes a corresponding one of virtual network (VN) agents 35A-35X (collectively, "VN agents 35") that controls virtual networks 34 and that coordinates the routing of data packets within computing device 12. In general, each VN agent 35 communicates with controller 23, which generates commands to control routing of packets through data center 10A. VN agents 35 may operate as a proxy for control plane messages between virtual machines 15 and controller 23. For example, a VM 15 may request to send a message using its virtual address via the VN agent 35A, and VN agent 35A may in turn send the message and request that a response to the message be received for the virtual address of the VM 15 that originated the first message. In some cases, a VM 15 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 15 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual nodes 13, e.g., within the hypervisor or the host operating system running on each of computing devices 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting computing devices 12. Besides IPinIP, other example tunneling protocols that may be used include IP over GRE, VXLAN, MPLS over GRE, MPLS over UDP, etc.

As noted above, controller 23 provides a logically centralized controller for facilitating operation of one or more virtual networks within data center 10A. Controller 23 may, for example, maintain a routing information base, e.g., one or more routing tables that store routing information for the physical network as well as one or more networks of data center 10A. Similarly, switches 16, 18 and virtual nodes 13 maintain routing information, such as one or more routing and/or forwarding tables. In one example implementation, virtual router 13A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack. Each NFT 32 also stores flow information that identifies actions for packet flows and where packet flows are to be forwarded.

In accordance with the techniques described in this disclosure, a computing device may provide automatic policy configuration for packet flows using, e.g., a kernel of the computing device and without sending packets to the user space, in accordance with techniques described in this disclosure. For example, computing device 12A may host VM0 15 that provides an execution environment for an application workload. The application workload may originate a packet, e.g., packet 26, to be sent to a remote destination device (e.g., customers 11 or a remote computing device hosted in one of data centers 10B-10X in FIG. 1). Virtual node 13A running in a kernel of computing device 12A may receive packet 26 from the application workload and examine the information in packet 26 (e.g., 5-tuple and zone) to identify whether packet 26 belongs to an existing packet flow. For example, a virtual node 13A may perform a lookup of flow information (e.g., from a flow table) to determine whether keying information within packet 26 matches an entry within the flow information of $NFT_0$ 32. If the keying information within packet 26 does not match an entry within the flow information (and thus does not belong to an existing packet flow), computing device 12A may, instead of sending packet 26 to a user space of computing device 12A, configure, via the kernel of computing device 12A, a policy for the forward packet flow, and install flow information for the new packet flow in $NFT_0$ 32.

The kernel of computing device 12A may configure a flow action of the policy for the forward packet flow to forward packets originating from the application workload running on VM0 15. The kernel may also perform a lookup of the forwarding information in $NFT_0$ 32 with an L3 address (e.g., destination IP address) of packet 26, e.g., either with an exact match or a longest prefix match (LPM), to determine the next hop and configures the next hop for the forward packet flow as an entry within the flow information. In some examples, the kernel of computing device 12A may configure other policies to be applied to the forward packet flow, such as NAT, firewall, or other policies.

The kernel of virtual router 13A may also configure a policy for the reverse packet flow while handling packet 26 flowing in the forward direction, and store the policy for the reverse packet flow in $NFT_0$ 32. As described above, virtual node 13A may forward packet 26 to a remote destination device using VXLAN tunnels or MPLS over GRE/UDP tunnels. In some examples in which virtual node 13A forwards packet 26 using a VXLAN tunnel, an ingress interface of virtual node 13A may encapsulate packet 26 with a virtual network identifier (VNI) such as a VXLAN tag that identifies the virtual network VN0 34 of the application workload running on VM0 15. $NFT_0$ 32 may include a mapping between the VNI and the virtual network VN0 of the application workload. In these examples, the kernel of computing device 12A may further map the VNI to zone 36. The kernel of computing device 12A configures virtual node 13A to perform a lookup of $NFT_0$ 32 with the VNI included in a packet received in the reverse direction (e.g., packet 28) to determine the zone, which is then used as keying information to perform a lookup of the flow information to determine the policy for the reverse packet flow. The kernel of computing device 12A may also configure a next hop for the reverse packet flow to VM0 15 hosting the application workload.

In this way, when virtual node 13A receives a VXLAN packet in the reverse direction, e.g., packet 28, including a VNI mapped to zone 36, virtual router 13A examines the information in packet 28 (e.g., 5-tuple and zone) to identify whether packet 28 belongs to an existing packet flow. Virtual node 13A determines the zone from the VNI included in packet 28 and using the zone and other information in packet 28 as keying information, performs a lookup of the flow information in $NFT_0$ 32 to determine the policy for the reverse packet flow. Virtual node 13A then forwards packet 28 to VM0 15 in accordance with the policy for the reverse packet flow.

In some examples in which virtual node 13A forwards packet 26 using an MPLS over GRE/UDP tunnel, an ingress interface of virtual node 13A may encapsulate packet 26 with an MPLS label that identifies the virtual network VN0 34 of the application workload running on VM0 15. $NFT_0$ 32 may include a mapping between the MPLS label and the virtual network VN0 of the application workload. In these examples, the kernel of computing device 12A may further map the MPLS label to zone 36. The kernel of computing device 12A configures virtual node 13A to perform a lookup of $NFT_0$ 32 with the MPLS label included in a packet received in the reverse direction (e.g., packet 28) to determine the zone, which is then used as keying information to perform a lookup of the flow information to determine the policy for the reverse packet flow. The kernel of computing device 12A may also configure a next hop for the reverse packet flow to VM0 15 hosting the application workload.

In this way, when virtual node 13A receives an MPLS packet in the reverse direction, e.g., packet 28, including a MPLS mapped to zone 36, virtual router 13A examines the information in packet 28 (e.g., 5-tuple and zone) to identify whether packet 28 belongs to an existing packet flow. Virtual node 13A determines the zone from the VNI included in packet 28 and using the zone and other information in packet 28 as keying information, performs a lookup of the flow information in $NFT_0$ 32 to determine the policy for the reverse packet flow. Virtual node 13A then forwards packet 28 to VM0 15 in accordance with the policy for the reverse packet flow.

Figure 3:
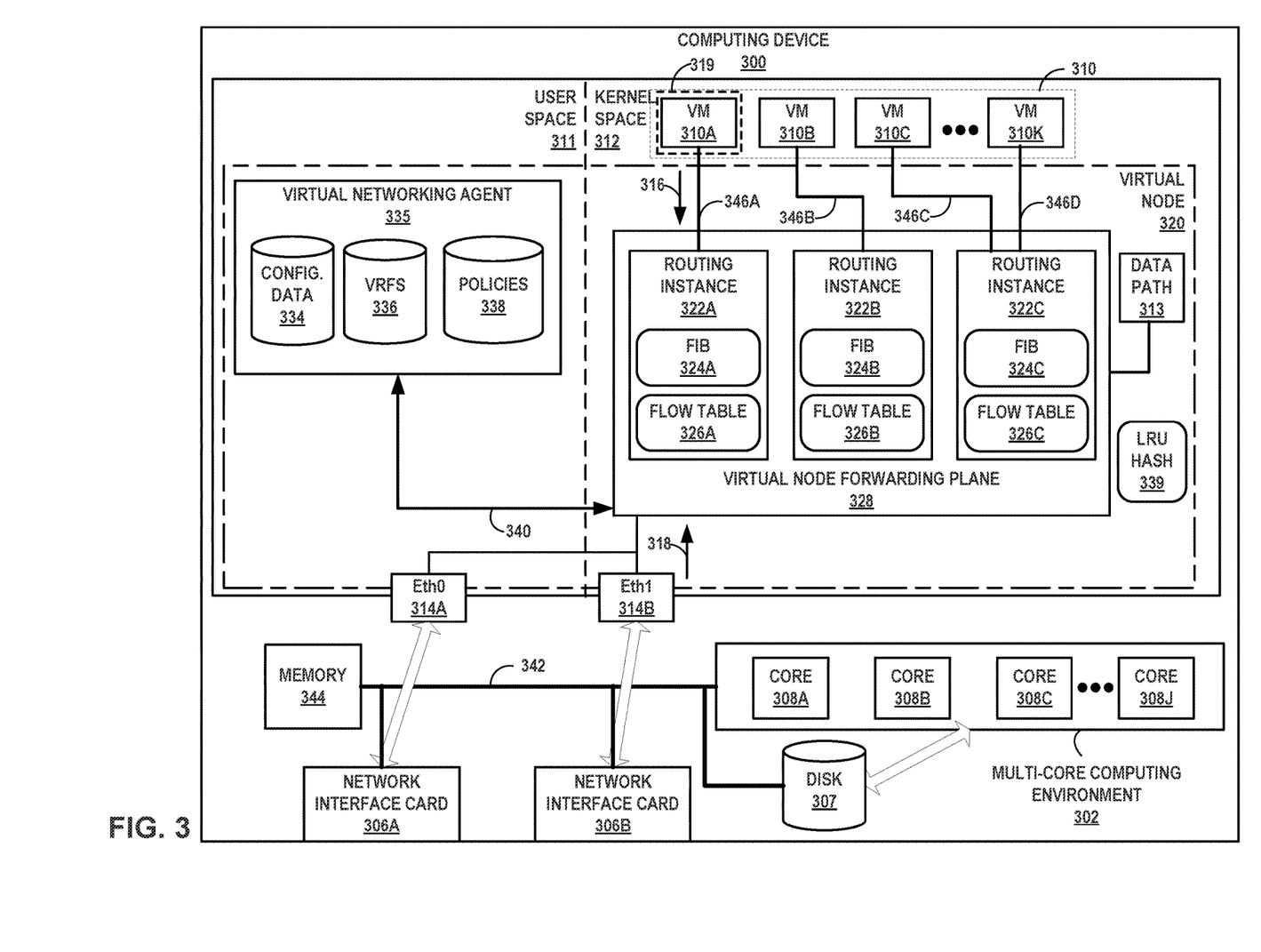
FIG. 3 is a block diagram illustrating an example computing device, in accordance with the techniques described in this disclosure.

FIG. 3 is a block diagram illustrating an example computing device, in accordance with the techniques described in this disclosure. Computing device 300 may represent an example instance of any of computing devices 12 of FIGS. 1-2.

Computing device 300 includes in this example a system bus 342 coupling hardware components of a computing device 100 hardware environment. System bus 342 couples memory 344, network interface cards (NICs) 306A-306B (collectively, "NICs 306"), storage disk 307, and multi-core computing environment 302 having a plurality of processing cores 308A-308J (collectively, "processing cores 308"). Network interface cards 306 include interfaces configured to exchange packets using links of an underlying physical network. Multi-core computing environment 302 may include any number of processors and any number of hardware cores. Each of processing cores 308 each includes an independent execution unit to perform instructions that conform to an instruction set architecture for the core. Processing cores 308 may each be implemented as separate integrated circuits (ICs) or may be combined within one or more multi-core processors (or "many-core" processors) that are each implemented using a single IC (i.e., a chip multiprocessor).

Disk 307 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 308.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 3544 provides a physical address space composed of addressable memory locations.

Memory 344 may in some examples present a non-uniform memory access (NUMA) architecture to multi-core computing environment 302. That is, cores 308 may not have equal memory access time to the various storage media that constitute memory 344. Cores 308 may be configured in some instances to use the portions of memory 344 that offer the lowest memory latency for the cores to reduce overall memory latency.

In some instances, a physical address space for a computer-readable storage medium may be shared among one or more cores 308 (i.e., a shared memory). For example, cores 308A, 308B may be connected via a memory bus (not shown) to one or more DRAM packages, modules, and/or chips (also not shown) that present a physical address space accessible by cores 308A, 308B. While this physical address space may offer the lowest memory access time to cores 308A, 308B of any of portions of memory 344, at least some of the remaining portions of memory 344 may be directly accessible to cores 308A, 308B. One or more of cores 308 may also include an L1/L2/L3 cache or a combination thereof. The respective caches for cores 308 offer the lowest-latency memory access of any of storage media for the cores 308.

Memory 344, network interface cards (NICs) 306A-306B (collectively, "NICs 306"), storage disk 307, and multi-core computing environment 302 provide an operating environment for a software stack that executes a virtual node 320 and one or more virtual machines 310A-310K (collectively, "virtual machines 310"). Virtual node 320 may represent example instances of any of virtual nodes 13 of FIGS. 1-2. Virtual machines 310 may represent example instances of any of virtual machines 15 of FIG. 1-2. The computing device 300 partitions the virtual and/or physical address space provided by main memory 344 and in the case of virtual memory by disk 307 into user space 311, allocated for running user processes, and kernel space 312, which is protected and generally inaccessible by user processes. An operating system kernel (not shown in FIG. 3) may execute in kernel space and may include, for example, a Linux, Berkeley Software Distribution (BSD), another Unix-variant kernel, or a Windows server operating system kernel, available from Microsoft Corp. Computing device 300 may in some instances execute a hypervisor to manage virtual machines 310 (also not shown in FIG. 3). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 324 may execute the virtual node 320.

Eth0 314A and Eth1 314B represent devices according to a software device model and provide device driver software routines for handling packets for receipt/transmission by corresponding NICs 306. Packets received by NICs 306 from the underlying physical network fabric for the virtual networks may include an outer header to allow the physical network fabric to tunnel the payload or "inner packet" to a physical network address for one of NICs 306. The outer header may include not only the physical network address but also a virtual network identifier such as a VXLAN tag or MPLS label that identifies one of the virtual networks as well as the corresponding routing instance 322. An inner packet includes an inner header having a destination network address that conform to the virtual network addressing space for the virtual network identified by the virtual network identifier. For example, virtual node forwarding plane 328 may receive by Eth1 314A from NIC 306A a packet having an outer header than includes a VXLAN associated in virtual node forwarding plane 328 with routing instance 322A. The packet may have an inner header having a destination network address that is a destination address of VM 310A that taps, via tap interface 346A, into routing instance 322A.

Virtual node 320 in this example includes a kernel space 312 module: virtual node forwarding plane 328, as well as a user space 311 module: VN agent 335. Virtual node forwarding plane 328 executes the "forwarding plane" or packet forwarding functionality of the virtual node 320 and VN agent 335 executes the "control plane" functionality of the virtual node 320. VN agent 335 may represent an example instance of any of VN agents 35 of FIG. 2.

Virtual node forwarding plane 328 includes multiple routing instances 322A-322C (collectively, "routing instances 322") for corresponding virtual networks. Each of routing instances 322 includes a corresponding one of forwarding information bases (FIBs) 324A-324C (collectively, "FIBs 324") and flow tables 326A-326C (collectively, "flow tables 326"). Although illustrated as separate data structures, flow tables 326 may in some instances be logical tables implemented as a single table or other associative data structure in which entries for respective flow tables 326 are identifiable by the virtual network identifier (e.g., a VRF identifier such as VXLAN tag or MPLS label)). FIBs 324 include lookup tables that map destination addresses to destination next hops. The destination addresses may include layer 3 network prefixes or layer 2 MAC addresses. Flow tables 326 enable application of forwarding policies to flows. Each of flow tables 326 includes flow table entries that each match one or more flows that may traverse virtual node forwarding plane 328 and include a forwarding policy for application to matching flows. For example, virtual node forwarding plane 328 attempts to match packets processed by routing instance 322A to one of the flow table entries of flow table 326A. If a matching flow table entry exists for a given packet, virtual node forwarding plane 328 applies the flow actions specified in a policy to the packet. This may be referred to as "fast-path" packet processing. If a matching flow table entry does not exist for the packet, the packet may represent an initial packet for a new packet flow. In these examples, virtual node forwarding plane 328 may typically request VN agent 335 to install a flow table entry in the flow table for the new packet flow. This may be referred to as "slow-path" packet processing for initial packets of packet flows and is represented in FIG. 3 by slow path 340.

In these examples, VN agent 335 may be a user space 311 process executed by computing device 300. VN agent 335 includes configuration data 334, virtual routing and forwarding instances configurations 336 ("VRFs 336"), and policy table 338 ("policies 338"). VN agent 335 exchanges control information with one or more controllers (e.g., controller 23 of FIGS. 1-2). Control information may include, virtual network routes, low-level configuration state such as routing instances and forwarding policy for installation to configuration data 334, VRFs 336, and policies 338. VN agent 335 may also report analytics state, install forwarding state to FIBs 324 of virtual node forwarding plane 328, discover VMs 310 and attributes thereof. As noted above, VN agent 335 further applies slow-path packet processing for the first (initial) packet of each new flow traversing virtual node forwarding plane 528 and installs corresponding flow entries to flow tables 326 for the new flows for fast path processing by virtual router forwarding plane 328 for subsequent packets of the flows.

In accordance with the techniques described in this disclosure, a computing device may provide automatic policy configuration for packet flows using, e.g., a kernel space 312 module and without sending packets to the user space 311 module, in accordance with techniques described in this disclosure.

In the example of FIG. 3, kernel space 312 module includes a data path 313 module to configure policies for new flows without requesting VN agent 335 of the user space 311 module to install flow table entries in the flow tables for the new packet flows. Data path 313 module may be a software module (e.g., eBPF) that runs in kernel space 312 and is invoked when packets are received from an interface virtual node 320.

As one example, computing device 300 hosts VM 310A that provides an execution environment for an application workload. The application workload may originate a packet, e.g., packet 316, to be sent to a remote destination device (e.g., customers 11 or a remote computing device hosted in one of data centers 10B-10X in FIG. 1). Virtual node 320 running in kernel space 312 may receive packet 316 from the application workload and examine the information in packet 316 (e.g., 5-tuple and zone) to identify whether packet 316 belongs to an existing packet flow. For example, a virtual node 320 may perform a lookup of flow table 326A to determine whether keying information within packet 316 matches an entry within flow table 326A. If the keying information within packet 316 does not match an entry within flow table 326A (and thus is part of a new packet flow), computing device 300 may, instead of sending packet 326 to user space 311, configure, via data path 313 module of kernel space 312, a policy for the forward packet flow, and install a flow table entry in flow table 326A for the new packet flow.

Data path 313 module of kernel space 312 may configure a flow action of the policy for the forward packet flow to forward packets originating from the application workload running on VM 310A. Data path 313 module of kernel space 312 may also perform a lookup of the forwarding information in FIB 324A with an L3 address (e.g., destination IP address) of packet 316, e.g., either with an exact match or a longest prefix match (LPM), to determine the next hop and configures the next hop for the forward packet flow within flow table 326A. In some examples, the data path 313 module of kernel space 312 may configure other policies to be applied to the forward packet flow, such as NAT, firewall, or other policies.

Data path 313 module of kernel space 312 may also configure a policy for the reverse packet flow while handling packet 316 flowing in the forward direction, and store the policy for the reverse packet flow in flow table 326A. As described above, computing device 300 may forward packet 316 to a remote destination device using VXLAN tunnels or MPLS over GRE/UDP tunnels. In some examples in which computing device 300 forwards packet 316 using a VXLAN tunnel, an ingress interface, e.g., one of network interface cards 306, may encapsulate packet 316 with a virtual network identifier (VNI) such as a VXLAN tag that identifies the virtual network of the application workload running on VM 310A. FIB 324A may include a mapping between the VNI and the virtual network of the application workload running on VM 310A. In these examples, the data path 313 module of kernel space 312 may further map the VNI to zone 319. The data path 313 module of kernel space 312 configures virtual node 320 to perform a lookup of flow table 326A with the VNI included in a packet received in the reverse direction (e.g., packet 318) to determine the zone, which is then used as keying information to perform a lookup of flow table 326A to determine the policy for the reverse packet flow. The data path 313 module of kernel space 312 may also configure a next hop for the reverse packet flow to VM 310A hosting the application workload.

In this way, when virtual node forwarding plane 328 receives a packet (e.g., packet 318) from the underlying physical network fabric for the virtual networks (e.g., by an Eth 314 from a NIC 306) that includes an outer header including the VNI mapped to zone 319, virtual node 320 may determine the zone from the VNI included in packet 318 and using the zone and other information in packet 318 as keying information, performs a lookup of flow table 326A to determine the policy for the reverse packet flow, and forwards packet 318 to VM 310A in accordance with the policy for the reverse packet flow.

In some examples in which computing device 300 may forward packet 316 to a remote destination device using MPLS over GRE/UDP tunnels, an ingress interface, e.g., one of network interface cards 306, may encapsulate packet 316 with an MPLS label that identifies the virtual network of the application workload running on VM 310A. FIB 324A may include a mapping between the MPLS label and the virtual network of the application workload running on VM 310A. In these examples, the data path 313 module of kernel space 312 may further map the MPLS to zone 319. The data path 313 module of kernel space 312 configures virtual node 320 to perform a lookup of flow table 326A with the MPLS label included in a packet received in the reverse direction (e.g., packet 318) to determine the zone, which is then used as keying information to perform a lookup of flow table 326A to determine the policy for the reverse packet flow. The data path 313 module of kernel space 312 may also configure a next hop for the reverse packet flow to VM 310A hosting the application workload.

In this way, when virtual node forwarding plane 328 receives a packet (e.g., packet 318) from the underlying physical network fabric for the virtual networks (e.g., by an Eth 314 from a NIC 306) that includes an outer header including the MPLS label mapped to zone 319, virtual node 320 may determine the zone from the MPLS label included in packet 318 and using the zone and other information in packet 318 as keying information, performs a lookup of flow table 326A to determine the policy for the reverse packet flow, and forwards packet 318 to VM 310A in accordance with the policy for the reverse packet flow.

In some examples, computing device 300 may control resources allocated to performing the automatic policy configuration for packet flows. For example, the kernel space 312 may create entries for a hash map table, e.g., least recently used (LRU) hash map 339, that tracks the least recently used flow entries that configured by data path 313 module. Computing device 300 may be configured to store a hash entry for each use of a policy that was created using the techniques described in this disclosure. For example, the data path 313 module (or another module) of kernel space 312 may create entries in the hash when a packet flow is created. For flow entries that are least recently used, the kernel space 312 may remove the least recently used flow entries using the LRU hash map 339. In some examples, the user space 311 may check for entries that are inactive (e.g., inactive for a period of time) and removes the entries from the LRU hash map 339.

In some examples, computing device 300 may also limit the number of flow entries that are configured from the automatic policy configuration for packet flows. In these examples, virtual interfaces (e.g., tap interfaces 346) may each be configured with a maximum number of flows to be automatically configured by data path 313 module in kernel space 312. In these examples, when the maximum number of flows for a virtual interface is exceeded, computing device 300 may revert back to sending packets for a new packet flow to the user space 311 module to request VN agent 335 to install a flow table entry in the flow table for the new packet flow. In this way, computing device 300 may prevent a single virtual interface from unfairly allocating an unfair proportion of the available resources.

Figure 4:
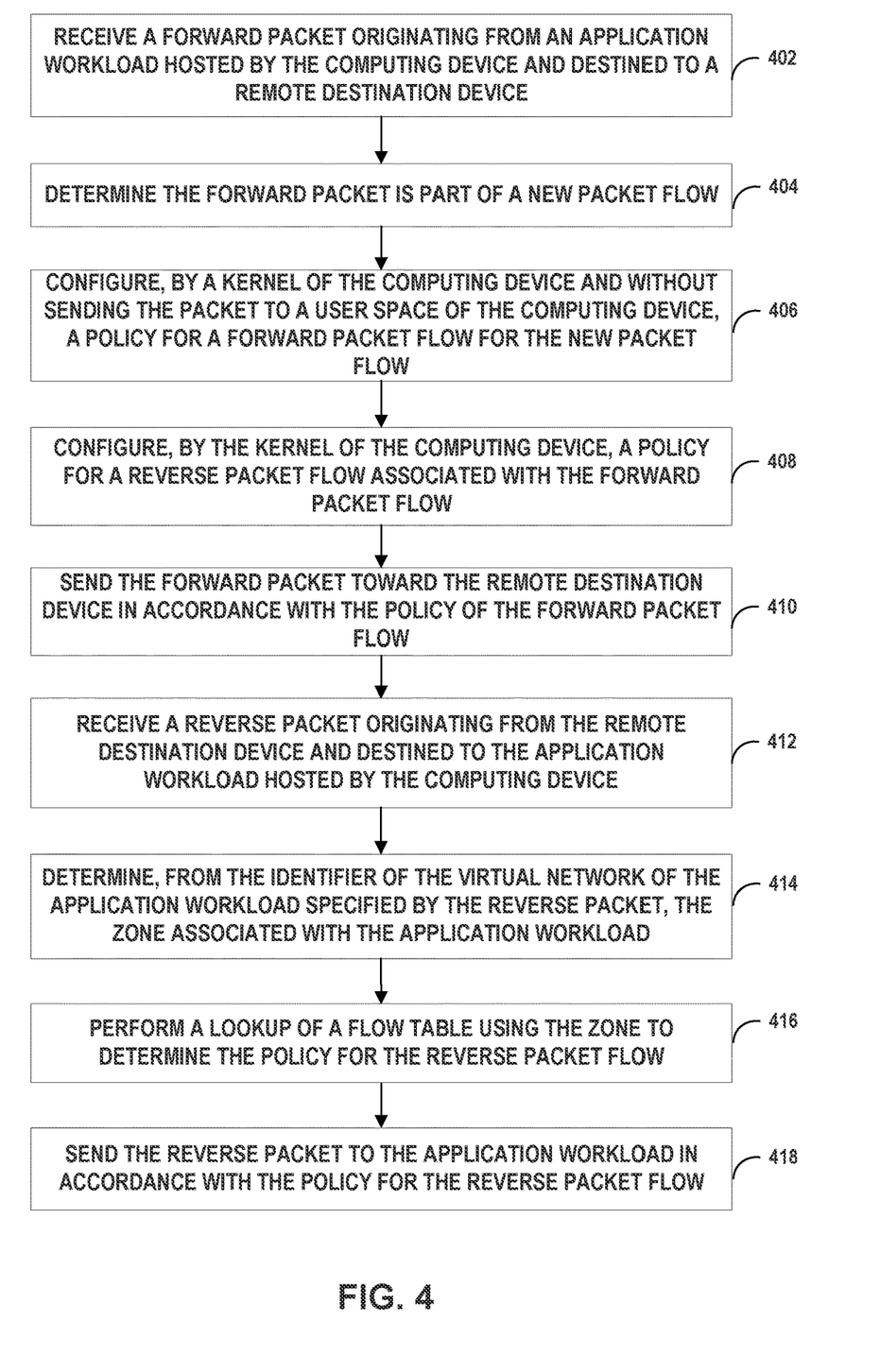
FIG. 4 is a flowchart illustrating an example operation in accordance with the techniques of the disclosure.

FIG. 4 is a flowchart illustrating an example operation in accordance with the techniques of the disclosure. For convenience, FIG. 4 is described with respect to FIG. 3, but may represent any of computing devices 12 of FIGS. 1-2.

In the example of FIG. 4, virtual node 320 implemented by computing device 300 receives a packet originating from an application workload that is locally hosted on the computing device and destined to a remote destination device (402). For example, computing device 300 hosts a virtual execution element (e.g., VM 310A of FIG. 3) that provides an execution environment for an application workload. The application workload may originate a packet, e.g., packet 316, to be sent to a remote destination device. Virtual node 320 running in kernel space 312 may receive packet 316 from the application workload and examine the information in packet 316 (e.g., 5-tuple and zone) to determine whether packet 316 belongs to an existing packet flow. For example, a virtual node 320 may perform a lookup of flow table 326A to determine whether keying information within packet 316 matches an entry within flow table 326A. If the keying information within packet 316 does not match an entry within flow table 326A, virtual node 320 determines the packet is part of a new packet flow (404).

In response to determining the packet is part of a new packet flow, computing device 300 may, instead of sending packet 326 to user space 311, configure, by a kernel space 312 of the computing device, a policy for a forward packet flow for the new packet flow (406). For example, data path 313 module of kernel space 312 may configure a policy for the forward packet flow and install a flow table entry in flow table 326A for the new packet flow. Data path 313 module of kernel space 312 may also perform a lookup of the forwarding information in FIB 324A with an L3 address (e.g., destination IP address) of packet 316, e.g., either with an exact match or a longest prefix match (LPM), to determine the next hop and configures the next hop for the forward packet flow within flow table 326A.

The computing device 300 may also configure, by a kernel space 312 of the computing device, a policy for a reverse packet flow associated with the forward packet flow (408). For example, the data path 313 module of kernel space 312 may further map an identifier of a virtual network associated with the application workload to a zone (e.g., zone 319). The identifier of the virtual network may comprise a virtual network identifier (VNI) such as a VXLAN tag or an MPLS label that identifies the virtual network of the application workload. The data path 313 module of kernel space 312 configures virtual node 320 to perform a lookup of flow table 326A with the VNI or MPLS label included in a packet received in the reverse direction (e.g., packet 318) to determine the zone, which is then used as keying information to perform a lookup of flow table 326A to determine the policy for the reverse packet flow. The data path 313 module of kernel space 312 may also configure a next hop for the reverse packet flow to VM 310A hosting the application workload.

In response to configuring the policies for the forward packet flow and the reverse packet flow, computing device 300 sends the packet toward the remote destination device in accordance with the policy for the forward packet flow (410). For example, an ingress interface of computing device 300 may encapsulate an outer header including the identifier of the virtual network of the application workload (e.g., VXLAN tag for VXLAN packet or MPLS label for MPLS packet) mapped to zone 319 such that the remote destination device may also encapsulate an outer header including the identifier of the virtual network of the application workload to a packet originating from the remote destination device and destined to the application workload.

When virtual node 320 of computing device 300 receives a packet originating from the remote destination device and destined to the application workload (e.g., packet 318) (412), virtual node 320 may determine the zone from the VNI or MPLS label included in packet 318 and using the zone and other information in packet 318 as keying information (414). Virtual node 320 of computing device 300 performs a lookup of flow table 326A using the zone to determine the policy for the reverse packet flow associated with the forward packet flow (416) and sends packet 318 to VM 310A in accordance with the policy for the reverse packet flow (418).

In some examples, computing device 300 may control resources allocated to performing the automatic policy configuration for packet flows. As described above, the kernel space 312 may create entries for an LRU hash map 339 that tracks the least recently used flow entries that configured by data path 313 module. For flow entries that are least recently used, the kernel space 312 may remove the least recently used flow entries using the LRU hash map 339. In some examples, the user space 311 may check for entries that are inactive (e.g., inactive for a period of time) and removes the entries from the LRU hash map 339.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
   receiving, by a virtual node implemented by a computing device, a packet originating from an application workload hosted on the computing device and destined for a remote destination device;
   determining, by the virtual node, the packet is part of a new packet flow;
   in response to determining the packet is part of a new packet flow, configuring, by a kernel of the computing device and without sending the packet to a user space of the computing device, a policy for a forward packet flow for the new packet flow, wherein the policy for the forward packet flow is configured outside the user space by the kernel;
   configuring, by the kernel of the computing device, a policy for a reverse packet flow associated with the forward packet flow; and
   sending, by the computing device, the packet toward the remote destination device in accordance with the policy for the forward packet flow.

2. The method of claim 1, wherein configuring the policy for the forward packet flow comprises:
   configuring, based on a lookup of a destination address of the packet within forwarding information of the computing device, a next hop for the forward packet flow.

3. The method of claim 1, wherein configuring the policy for the reverse packet flow comprises mapping a zone associated with the application workload with an identifier of a virtual network of the application workload, and
   wherein sending the packet toward the remote destination device in accordance with the policy for the forward packet flow comprises inserting the identifier of the virtual network of the application workload into the packet prior to sending the packet toward the remote destination device.

4. The method of claim 3, wherein the packet originating from the application workload hosted on the computing device and destined for the remote destination device comprises a forward packet, the method further comprising:
   receiving, by the virtual node implemented by the computing device, a reverse packet originating from the remote destination device and destined to the application workload hosted on the computing device, wherein the reverse packet specifies the identifier of the virtual network of the application workload;
   determining, by the virtual node and from the identifier of the virtual network of the application workload specified by the reverse packet, the zone associated with the application workload;
   performing, by the virtual node, a lookup of a flow table using the zone to determine the policy for the reverse packet flow; and
   sending, by the virtual node, the reverse packet to the application workload in accordance with the policy for the reverse packet flow.

5. The method of claim 3, wherein the identifier of the virtual network comprises at least one of a Virtual Extensible Local Area Network (VXLAN) tag or Multiprotocol Label Switching (MPLS) label.

6. The method of claim 1, further comprising:
   storing, for the policy for the forward packet flow and the policy for the reverse packet flow, a respective hash entry in a flow entry hash map to track a least recently used policy;
   determining the policy for the forward packet flow or the policy for the reverse packet flow is the least recently used policy; and
   in response to determining the policy for the forward packet flow or the policy for the reverse packet flow is the least recently used policy, removing, with the kernel or the user space of the computing device, the least recently used policy.

7. The method of claim 1,
   configuring, by the computing device, a maximum number of flows to be created for a virtual interface to the application workload;
   receiving, by the virtual node, a subsequent packet originating from the application workload hosted on the computing device and destined for a second remote destination device;
   determining the maximum number of flows to be created for the virtual interface to the application workload is exceeded; and
   sending, with the kernel of the computing device, the subsequent packet to a user space of the computing device to configure a policy for a forward packet flow for the subsequent packet.

8. A computing device comprising:
   a virtual node;
   one or more virtual execution elements coupled to the virtual node;
   one or more processors, wherein the one or more processors are configured to:
     receive a packet originating from an application workload hosted on the one or more virtual execution elements and destined for a remote destination device;
     determine the packet is part of a new packet flow;
     in response to determining the packet is part of a new packet flow, configure, by a kernel of the computing device and without sending the packet to a user space of the computing device, a policy for a forward packet flow for the new packet flow, wherein the policy for the forward packet flow is configured outside the user space by the kernel;
     configure, with the kernel of the computing device, a policy for a reverse packet flow associated with the forward packet flow; and
     send the packet toward the remote destination device in accordance with the policy for the forward packet flow.

9. The computing device of claim 8, wherein to configure the forward packet flow, the one or more processors are configured to:
   configure, based on a lookup of a destination address of the packet within forwarding information of the computing device, a next hop for the forward pack et flow.

10. The computing device of claim 8,
   wherein to configure the reverse packet flow for the packet, the one or more processors are configured to map a zone associated with the application workload with an identifier of a virtual network of the application workload, and
   wherein to send the packet toward the remote destination device in accordance with the policy for the forward packet flow, the one or more processors are configured to insert the identifier of the virtual network of the application workload into the packet prior to sending the packet toward the remote destination device.

11. The computing device of claim 10, wherein the packet originating from the application workload hosted on the computing device and destined for the remote destination device comprises a forward packet, the one or more processors are configured to:
    receive a reverse packet originating from the remote destination device and destined to the application workload hosted on the computing device, wherein the reverse packet specifies the identifier of the virtual network of the application workload;
    determine from the identifier of the virtual network of the application workload specified by the reverse packet, the zone associated with the application workload;
    perform a lookup of a flow table using the zone to determine the policy for the reverse packet flow; and
    send the reverse packet to the application workload in accordance with the policy for the reverse packet flow.

12. The computing device of claim 10, wherein the identifier of the virtual network comprises at least one of a Virtual Extensible Local Area Network (VXLAN) tag or Multiprotocol Label Switching (MPLS) label.

13. The computing device of claim 8, wherein the one or more processors are further configured to:
    store, for the policy for the forward packet flow and the policy for the reverse packet flow, a respective hash entry in a flow entry hash map to track a least recently used policy;
    determine the policy for the forward packet flow or the policy for the reverse packet flow is the least recently used policy; and
    in response to determining the policy for the forward packet flow or the policy for the reverse packet flow is the least recently used policy, remove, with the kernel or the user space of the computing device, the least recently used policy.

14. The computing device of claim 8,
    configure a maximum number of flows to be created for a virtual interface to the application workload;
    receive a subsequent packet originating from the application workload hosted on the computing device and destined for a second remote destination device;
    determine the maximum number of flows to be created for the virtual interface to the application workload is exceeded; and
    send, with the kernel of the computing device, the subsequent packet to a user space of the computing device to configure a policy for a forward packet flow for the subsequent packet.

15. A non-transitory computer-readable medium comprising instructions that, when executed, cause one or more processors of a computing device to:
    receive a packet originating from an application workload hosted on one or more virtual execution elements and destined for a remote destination device;
    determine the packet is part of a new packet flow;
    in response to determining the packet is part of a new packet flow, configure, by a kernel of the computing device and without sending the packet to a user space of the computing device, a policy for a forward packet flow for the new packet flow, wherein the policy for the forward packet flow is configured outside the user space by the kernel;
    configure, with the kernel of the computing device, a policy for a reverse packet flow associated with the forward packet flow; and
    send the packet toward the remote destination device in accordance with the policy for the forward packet flow.

16. The non-transitory computer-readable medium of claim 15, wherein the instructions further cause the one or more processors to:
    configure, based on a lookup of a destination address of the packet within forwarding information of the computing device, a next hop for the forward packet flow.

17. The non-transitory computer-readable medium of claim 15, wherein the instructions further cause the one or more processors to:
    map a zone associated with the application workload with an identifier of a virtual network of the application workload.

18. The non-transitory computer-readable medium of claim 15, wherein the packet originating from the application workload hosted on the computing device and destined for the remote destination device comprises a forward packet, wherein the instructions further cause the one or more processors to:
    receive a reverse packet originating from the remote destination device and destined to the application workload hosted on the computing device, wherein the reverse packet specifies an identifier of a virtual network of the application workload;
    determine from an identifier of a virtual network of the application workload specified by the reverse packet, a zone associated with the application workload;
    perform a lookup of a flow table using the zone to determine the policy for the reverse packet flow; and
    send the reverse packet to the application workload in accordance with the policy for the reverse packet flow.

19. The non-transitory computer-readable medium of claim 18, wherein the identifier of the virtual network comprises at least one of a Virtual Extensible Local Area Network (VXLAN) tag or Multiprotocol Label Switching (MPLS) label.

20. The non-transitory computer-readable medium of claim 15, wherein the instructions further cause the one or more processors to:
    store, for the policy for the forward packet flow and the policy for the reverse packet flow, a respective hash entry in a flow entry hash map to track a least recently used policy;
    determine the policy for the forward packet flow or the policy for the reverse packet flow is the least recently used policy; and
    in response to determining the policy for the forward packet flow or the policy for the reverse packet flow is the least recently used policy, remove, with the kernel or the user space of the computing device, the least recently used policy.

* * * * *